(12) United States Patent
Zhao et al.

(10) Patent No.: US 11,015,650 B2
(45) Date of Patent: May 25, 2021

(54) MANUFACTURING METHOD OF THIN-WALL BEARING AND METHOD FOR MACHINING THIN-WALL INNER RING/OUTER RING OF THE THIN-WALL BEARING AS WELL AS PRECISE FLEXIBLE BEARING

(71) Applicant: SHANGHAI F&S BEARING TECH CO., LTD., Shanghai (CN)

(72) Inventors: Sicheng Zhao, Shanghai (CN); Lianchun Zhao, Shanghai (CN); Shuying Chen, Shanghai (CN)

(73) Assignee: Shanghai F&S Bearing Tech Co., Ltd., Shanghai (CN)

( * ) Notice: Subject to any disclaimer, the term of this patent is extended or adjusted under 35 U.S.C. 154(b) by 0 days.

(21) Appl. No.: 15/775,221

(22) PCT Filed: Nov. 9, 2016

(86) PCT No.: PCT/CN2016/105132
§ 371 (c)(1),
(2) Date: May 10, 2018

(87) PCT Pub. No.: WO2017/080442
PCT Pub. Date: May 18, 2017

(65) Prior Publication Data
US 2018/0328409 A1 Nov. 15, 2018

(30) Foreign Application Priority Data
Nov. 10, 2015 (CN) .......................... 201510758041.1

(51) Int. Cl.
*F16C 33/64* (2006.01)
*F16C 19/06* (2006.01)
*F16C 1/00* (2006.01)

(52) U.S. Cl.
CPC ................. *F16C 33/64* (2013.01); *F16C 1/00* (2013.01); *F16C 19/06* (2013.01); *F16C 2240/40* (2013.01); *F16C 2322/59* (2013.01)

(58) Field of Classification Search
CPC ........ F16C 33/64; F16C 33/14; F16C 33/208; F16C 33/7833; B23P 15/06; B23P 15/065; B23P 15/08
See application file for complete search history.

(56) References Cited

U.S. PATENT DOCUMENTS

| 2012/0137523 A1 | 6/2012 | Maeda et al. | |
| 2014/0008874 A1* | 1/2014 | Esser ........................ | C23C 8/80 277/443 |

FOREIGN PATENT DOCUMENTS

| CN | 101504036 A | 8/2009 |
| CN | 102310310 A | 1/2012 |

(Continued)

*Primary Examiner* — Christopher J Besler
(74) *Attorney, Agent, or Firm* — Muncy, Geissler, Olds & Lowe. P.C.

(57) ABSTRACT

The invention provides a manufacturing method for thin-wall bearing and a method for machining a thin-wall inner ring/outer ring as well as a precision flexible bearing. The method for machining the thin-wall inner ring/outer ring comprises the following steps of: S0, providing a thin-wall ring with machining allowance left; S1: reinforcing along the radial direction and/or axial direction of the thin-wall ring; S2: carrying out quenching-tempering heat treatment on the reinforcing ring obtained by reinforcement in the S1; S3: carrying out corresponding grinding, hard cutting and super finishing on the reinforcing ring after receiving heat treatment, which includes removal of the machining allowance and a reinforcing part obtained by reinforcement in the S1, thereby obtaining finished thin-wall ring product. The thin-wall ring reinforced machining method substantially reduces and even avoids deformation of the thin-wall ring in (Continued)

all manufacturing links, thereby obtaining very high machining precision. The precision thin-wall bearing and the precision flexible bearing can be manufactured by fitting of the precision thin-wall ring and a precision rolling body.

8 Claims, 6 Drawing Sheets

(56) References Cited

FOREIGN PATENT DOCUMENTS

| | | |
|---|---|---|
| CN | 103331456 A | 10/2013 |
| CN | 104001936 A | 8/2014 |
| CN | 105234637 A | 1/2016 |
| JP | H08270665 A | 10/1996 |

\* cited by examiner

MANUFACTURING METHOD OF THIN-WALL BEARING AND METHOD FOR MACHINING THIN-WALL INNER RING/OUTER RING OF THE THIN-WALL BEARING AS WELL AS PRECISE FLEXIBLE BEARING

TECHNICAL FIELD

The present invention relates to the field of machinery, in particular to a manufacturing process of a thin-wall bearing.

BACKGROUND ART

In the prior art, if outer diameter of a bearing is D, inner diameter is d, then a radial section size is (D−d)/2. In general, a rolling bearing having a radial cross-sectional dimension less than ¼ of the inner diameter, or less than ⅙ of the outer diameter, or less than twice the diameter of the rolling element can be regarded as a thin-wall rolling bearing. The weight of thin-wall bearings is generally less than ½ of the weight of the ultra-light series bearing with the same inner diameter. The weight of some types of thin-wall bearings is even less than ¹⁄₄₀ of the weight of ultra-light series bearings with the same inner diameter. Thus we can know that the wall is so thin and the width is so narrow.

With the development of main machine in the direction of integration, light weight, intelligence, and low power consumption, the size of the main machine is getting smaller and smaller, and the weight is getting lighter and lighter, but the accuracy is higher and the functions are more powerful, which promotes the design width of the rolling bearing is even narrower than the ultra-light series, and its radial section size is smaller than the ultra-light series, that is, it is designed as a thin-wall rolling bearing. Especially in recent years, with the rise of smart manufacturing, lightweight, smart, intelligent systems, hosts, and equipment represented by industrial robots have emerged in large numbers, making the thin-wall bearings to be more and more widely used.

When the cross-sectional dimension in each series of thin-wall bearings is designed to be a fixed value, it becomes an equal-section thin-wall bearing, such as 0.1875×0.1875 inch, 0.25×0.25 inch, 0.3125×0.3125 inch, 0.375×0.375 inch, 0.50×0.50 inches, 0.75×0.75 inches, and 1.0×1.0 inches. In the same series, the cross-sectional dimensions are constant, and do not increase with the increase of the inner diameter d, so it is called an equal-section thin-wall bearing. When a large-bore and small-diameter thin-wall bearing is used, a large-diameter hollow shaft can be used to substitute small-diameter solid shaft. Thus, air, light beams, water pipes, cables, etc. can be provided through space of the hollow shaft, making the design be more concise. Equal-section thin-wall bearings are widely used in industrial robots.

When wall thickness of the thin-wall bearing ring is only 0.01.4 to 0.023 times of the outer diameter of bearing, it becomes a flexible bearing, which should be considered as a type of thin-wall bearing. Flexible bearing is also known as harmonic bearing, and is the special bearing used for harmonic reducer. It is named for the extremely thin wall and cyclic bending changes during working. Harmonic decelerator is an advanced and precise decelerator. It is widely used in industrial robots, high-grade cars, aerospace, optical instruments, high-end printing presses and other precision machinery because of its advantages of small size, light weight, small backlash, high positioning accuracy and transmission efficiency, and easy implementation of precise position control. With the rise of intelligent manufacturing which takes the industrial robots as the core, harmonic reducers and RV reducers have received attention from all over the world due to their inherent advanced nature.

Thus, the thin-wall bearings are generally used in precise things, typically, such as harmonic reducer flexible bearings and RV reducer bearings, cross roller bearings used in lumbar and crotch of the robots for industrial robots, but because of the thin wall and narrow width of the thin-wall bearing, it is very easy to deform in all aspects of processing and it is very difficult to obtain high manufacturing precision.

Figure 1:
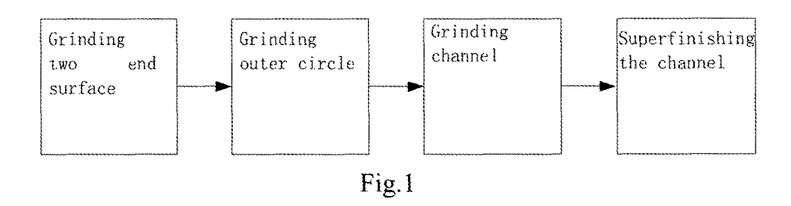
FIG. 1 is a schematic flow chart of a method for processing a flexible bearing outer ring in the prior art.
Figure 2:
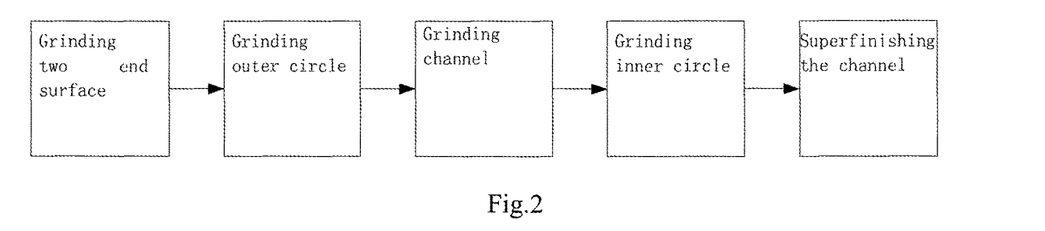
FIG. 2 is a schematic flow chart of a method for processing a flexible bearing inner ring in the prior art.

Taking flexible bearings as an example, the current thin-wall bearing manufacturers still use the cutting process flow of normal-wall bearing rings as shown in FIGS. 1 and 2, except that the placement of the rings during the heat treatment before cutting is paid attention and be careful. The channel needs to be grinded two or more times, and an additional tempering process is added between coarse grinding and fine grinding process. These measures said above can improve the manufacturing accuracy of the ring, but the degree of improvement is limited. And these measures has greatly reduced the manufacturing efficiency of the thin-wall rings, improved the thin-walled rings and thus increased the manufacturing costs of thin-wall bearings. The reason is that in the grinding and super finishing process, the ring will inevitably receive the magnetic attraction force, clamping force, supporting force from the jig, and the pressure and cutting force from the grinding wheel and the oil stone. Under the force said above, the ring with normal wall thickness will not be deformed or deformed minimally, while the ring with thin-wall, especially the flexible bearing ring, will undergo significant deformation. Thin-wall rings are difficult to obtain high machining accuracy and the increasing precision requirements of the main machine for thin-wall bearings have created a prominent pair of contradictions, which has severely constrained the further improvement of operation accuracy and limit speed of the main machine with lightweight. It is urgent and necessary to increase the processing methods for machining precision and processing efficiency of thin-wall bearing rings, especially flexible bearing rings.

SUMMARY

The present invention is to overcome technical problem of too many processes, low efficiency, high cost, and low precision in the current thin-wall bearing ring cutting processing.

In order to solve the technical problems said above, the present invention provides a method for machining a thin-wall inner ring/outer ring of a thin-wall bearing, comprising the following steps:

S0: providing a thin-wall ring with machining allowances left;

S1: reinforcing the thin-wall ring in the radial and/or axial direction;

S2: carrying out quenching and tempering heat treatment to the reinforcing ring obtained in the step S1 after reinforcement;

S3: carrying out corresponding grinding, hard cutting and super finishing on the reinforcing ring receiving heat treatment, which includes removal of the machining allowance and a reinforcing part obtained by reinforcement in the step 1, thereby obtaining the finished thin-wall ring.

Optionally, in the step S1, further reinforcing is performed in the radial direction of the thin-wall ring, and the reinforcing part is reinforced on the outer circular surface of the thin-wall ring provided in the step S0.

Optionally, in the step S0, the provided thin-walled ring has a raceway; in the step S3, the process of hard turning, grinding and superfinishing to the reinforcing ring further includes:
grinding two end surfaces, inner circular surface, outer circular surface and raceway surface of the reinforcing ring;
superfinishing the raceway surface after being grinded; and after that:
hart turning the outer circular surface of the reinforcing ring to remove the reinforcing part of the radial reinforcement.

Optionally, what machined is a thin-wall outer ring; the raceway surface intersects the inner circular surface.

Optionally, what machined is a thin-wall inner ring; the raceway surface intersects with the outer circular surface, and the reinforcing part is displaced staggered from the raceway surface.

Optionally, what machined is a thin-wall inner ring; in the step S0, the provided thin-wall ring is without a raceway; in the step S3, the hard turning, grinding and superfinishing process to the reinforcing ring further includes:
grinding two end surfaces, inner circular surface and outer circular surface of the reinforcing ring;
hard turning the outer circular surface of the reinforcing ring to remove the reinforcing part of the radial reinforcement, and hard-out a raceway surface on the outer circular surface;
superfinishing the raceway surface.

Optionally, wall thickness of the reinforcing part is 0.2 to 10 times the wall thickness of the thin-wall ring.

Optionally, in the step S1, further reinforce the thin-walled ring in the axial direction, and the reinforcing part is reinforced on one end surface of the thin-wall ring.

Optionally, in the step S3, the process of hard turning, grinding and superfinishing to the reinforcing ring further includes:
grinding two end surfaces and outer circular surface of the reinforcing ring;
clamping the reinforcing part, and hard turning the inner circular surface and raceway surface of the thin-wall ring;
hard cutting the thin-wall ring off from the axial reinforcement part;
grinding end face in the cutting off section of the thin-wall ring;
superfinishing the raceway surface.

Optionally, outer diameter of the reinforcing part is same as outer diameter of the thin-wall ring, the inner diameter is less than inner diameter of the thin-wall ring, and the width is 0.2 to 10 times width of the thin-wall ring.

Optionally, in the step S1, the reinforcement is further performed simultaneously along the radial and axial directions of the thin-wall ring; the reinforcing part includes a radial reinforcing part and an axial reinforcing part; the radial reinforcing part is located on the outer circular surface of the thin-wall ring, and the axial reinforcing part is located on one end surface of the thin-wall ring.

Optionally, in the process of removing the reinforcing part, the axial reinforcing part is first removed, and then the radial reinforcing part is removed.

Optionally, in the step S3, the process of hard turning, grinding and superfinishing to the reinforcing ring further includes:
grinding two end surfaces and outer circular surface of the reinforcing ring;
dividing the reinforcing ring into an axial reinforcing part and a remaining radial reinforcing ring, and clamping the axial reinforcing part, and hard turning the inner circular surface and the raceway surface of the radial reinforcing ring;
hard cutting the radial reinforcing ring off from the axial reinforcement part;
grinding end face in the cutting off section of the reinforcing ring;
superfinishing the raceway surface;
hard turning the outer circular surface and removing the radial reinforcing part.

Optionally, wall thickness of the radial reinforcing part is 0.2 to 10 times the wall thickness of the thin-wall ring; width of the axial reinforcing part is 0.2 to 10 times the width of the thin-wall ring, and outer diameter is equal to the outer diameter of the thin-wall ring that after radial reinforcement, and the inner diameter is equal to or smaller than the inner diameter of the thin-wall ring.

The present invention further provides a method for machining a thin-wall inner ring/outer ring of a thin-wall bearing, comprising the following steps:
S00: Providing a thin-wall ring group containing at least two thin-wall rings with a machining allowance; in the thin-wall ring group, each thin-wall ring is arranged in the axial direction, and two adjacent thin-wall rings are connected by connecting parts;
S10: reinforcing axially along one side of the thin-wall ring group to form a reinforcing ring group;
S20: performing a quenching and tempering heat treatment on the reinforcing ring group obtained in step S10;
S30: grinding, hard turning and superfinishing the heat-treated reinforcing ring group, and includes removing the machining allowance and the axial reinforcing part reinforced by step S10 and the connecting section to obtain a corresponding number of finished thin-wall rings.

Optionally, in the step S30, the process of hard turning, grinding and superfinishing to the reinforcing ring group further includes:
grinding two end surfaces and outer circular surface of the reinforcing ring group;
clamping the axial reinforcing part, and hard turning inner circular surface and raceway surface of the thin-wall ring group;
hard cutting each thin-wall ring off from the connecting part or the axial reinforcement part;
grinding end face in the cutting off section of each of the thin-wall ring;
superfinishing the raceway surface.

Optionally, the width of the axial reinforcing part is 0.2 to 10 times the width of the thin-wall ring, the inner diameter is smaller than the inner diameter of the thin-wall ring, and the outer diameter is same as the outer diameter of the thin-walled ring; the connecting portion has a width of 1 to 5 mm, an outer diameter less than or equal to the outer diameter of the thin-wall ring, and an inner diameter greater than or equal to the inner diameter of the thin-wall ring.

Optionally, in step S10, the method further includes reinforcing each thin-wall ring in the radial direction, and forming a radial reinforcing part on the outer circular surface of the thin-wall ring;
in the step S30, the process of hard turning, grinding and superfinishing to the ring further includes:
grinding the two end surfaces and the outer circular surface of the reinforcing ring;
dividing the reinforcing ring group into an axial reinforcing part and a radial reinforcing ring group, and holding the axial reinforcing part, and hard turning the inner circular surfaces and the raceway surfaces of the radial reinforcing ring group;

hard cutting each radial reinforcing ring of the radial reinforcing ring group off from the connecting part or the axial reinforcement part;

grinding end face in the cutting off section of each radial reinforcing ring;

superfinishing the raceway surface;

hard turning the outer circular surface and removing the radial reinforcing part.

Optionally, the wall thickness of the radial reinforcing part is 0.2 to 10 times the wall thickness of the thin-walled ring, and the outer diameter of the axial reinforcing part is equal to the outer diameter of the radial reinforced thin-wall ring.

Optionally, the present invention also provides a method for manufacturing a thin-wall bearing, including:

firstly, producing the thin-wall outer ring and inner ring by the method provided by the optional solution of the present invention;

then, sorting and assembling the thin-wall inner ring, the thin-wall outer ring and the finished rolling elements, and placing the retainer and assembling into a complete thin-wall bearing.

The present invention also provides a precision and flexible bearing with a single row ball bearing; the wall thickness of the outer ring and inner ring of the bearing are 0.014 to 0.023 times the outer diameter of the outer ring of the bearing, and has a groove-shaped raceway, wherein the bearing accuracy grade is not less than grade P4, the inner ring of the bearing is a flexible bearing inner ring, and the outer ring of the bearing is a flexible bearing outer ring, and is manufactured by the following manufacturing process:

producing the flexible bearing outer ring and inner ring with an accuracy grade which is not less than P4 grade by the optional method of present invention;

selecting a ball with an accuracy grade which is not less than G5, then sorting and assembling the flexible bearing inner ring, the flexible bearing outer ring and the balls, placing the retainer and assembling into a precision and flexible bearing with an accuracy grade which is not less than P4.

In the present invention and its alternatives, the reinforcement of the thin-wall bearing ring in the reinforcing process begins with the initial feeding of blanks, the wall thicknesses of the radial reinforcing ring are reinforced to close to the normal bearing wall thicknesses, the wall thickness of the reinforcing part of the axially-reinforced ring equals or exceeds the wall thickness of the normal bearing ring and the width of the reinforcing part is sufficient for clamping, the radial and axial bi-directional reinforcing rings are reinforced in both radial and axial directions. Because the ring is reinforced from the blank feeding, so it has the advantages of quality and efficiency in all stages of the manufacturing process:

(1) during the machining stage of the ring blank, since the ring is reinforced to be non thin-wall ring, the clamping deformation of the thin-wall ring can be avoided, so that the ring can be turned by the normal process and the fixture. In this manner, not only the turning processing efficiency can be improved, the scrap rate can be reduced, and the turning accuracy of the ring billet can be greatly improved, which has laid a very good precision foundation for the post-process heat treatment and the precision machining after the heat treatment;

(2) in the heat treatment stage of the ring, since the ring is reinforced, even if no special anti-deformation measures are taken, the heat treatment deformation of the ring can be controlled within an appropriate range, which not only improves the efficiency of the heat treatment process, but also the small heat treatment deformation is very beneficial to the improvement of the precision machining after the heat treatment and the controlled control of the machining surface;

(3) in the grinding, hard turning and superfinishing phases after heat treatment, the rings have a high accuracy foundation due to the reinforcement of the rings and plus the scientific scheduling of processing methods and sequence in the finishing process, the clamping and grinding of the thin-wall elements in the machining process can be completely avoided. Therefore, not only obtains extremely high machining accuracy, but also reduces processing steps and cost.

BRIEF DESCRIPTION OF THE DRAWINGS

In the drawings, 1—thin-wall outer ring; 2—thin-wall inner ring; 3—ball; 4—retainer; 5—reinforcing part; 51—axial reinforcing part; 52—radial reinforcing part; 6—connecting part. In the drawing, the outward of the surface with the remaining allowance that still needs to be machined is marked with a dashed line parallel to it, the ring body is filled with a unidirectional oblique hatching, the ring reinforcement portion and the connecting part between the ring and the ring are filled with bi-directional cross hatching.

DETAILED DESCRIPTION OF EMBODIMENTS

A method for manufacturing a thin-wall bearing and A method for machining a thin-walled inner ring/outer ring provided by the present invention will be described in detail through nine embodiments by reference to FIGS. 1 to 12, which are optional embodiments of the present invention. It should be known that those skilled in the art can modify and polish the present invention without changing the spirit and content of the present invention.

The present invention provides a method for machining a thin-wall inner ring/outer ring of a thin-wall bearing, comprising the following steps:

S0: providing a thin-wall ring with machining allowances left;
S1: reinforcing the thin-wall ring in the radial and/or axial direction;
S2: carrying out quenching and tempering heat treatment to the obtained reinforcing ring reinforced in the step S1;
S3: carrying out corresponding grinding, hard cutting and super finishing on the reinforcing ring receiving heat treatment, which includes removal of the machining allowance and a reinforcing part obtained by reinforcement in the step 1, thereby obtaining the thin-wall ring finished product.

Embodiments 1 to 3

Figure 3A:
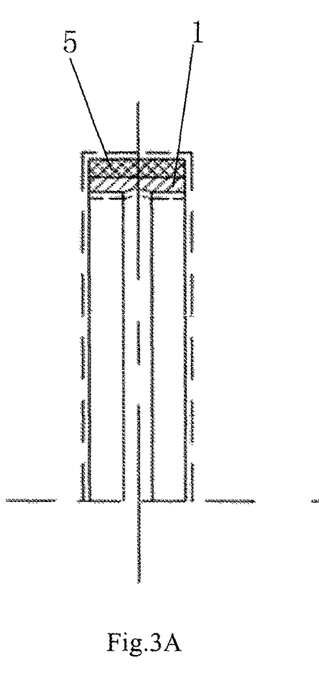
FIGS. 3A to 3C are schematic views of processing of a thin-wall outer ring of the first embodiment of the present invention.
Figure 3B:
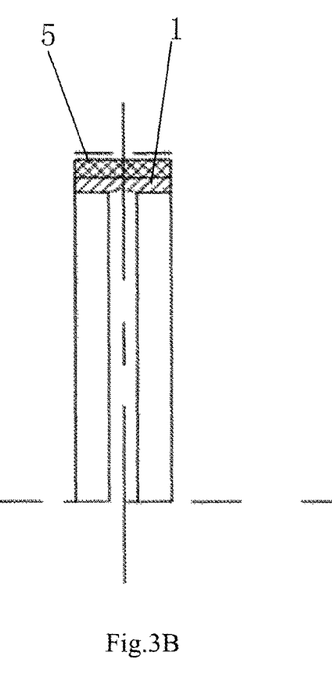
Figure 3C:
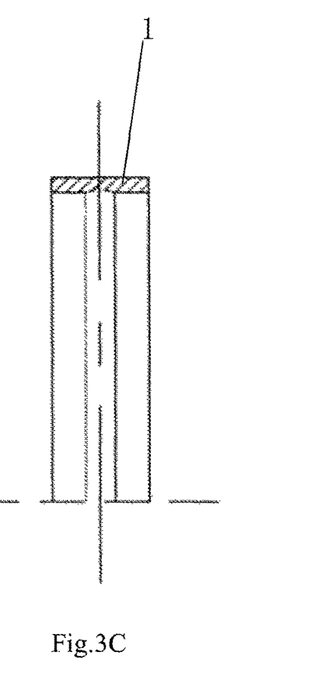
Figure 4A:
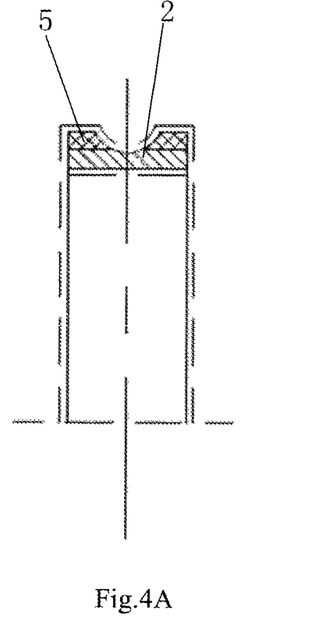
FIGS. 4A to 4C are schematic views of processing of a thin-wall inner ring of the second embodiment of the present invention.
Figure 4B:
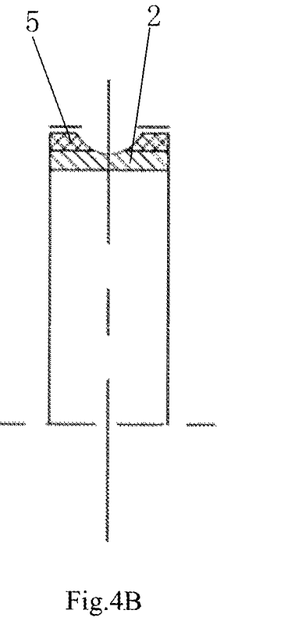
Figure 4C:
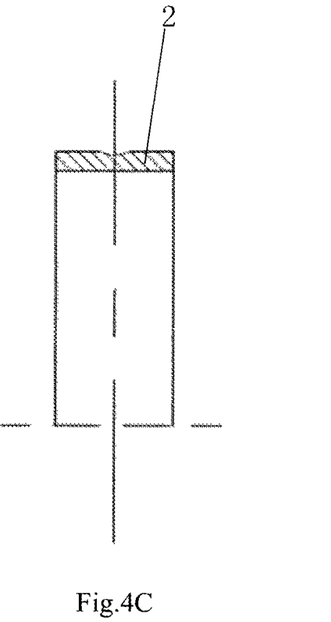
Figure 5A:
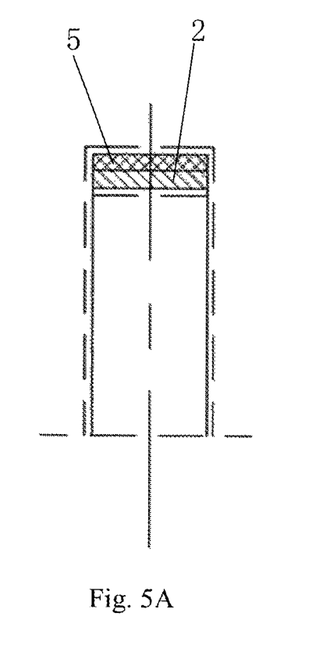
FIGS. 5A to 5C are schematic views of processing of a thin-wall inner ring of the third embodiment of the present invention.
Figure 5B:
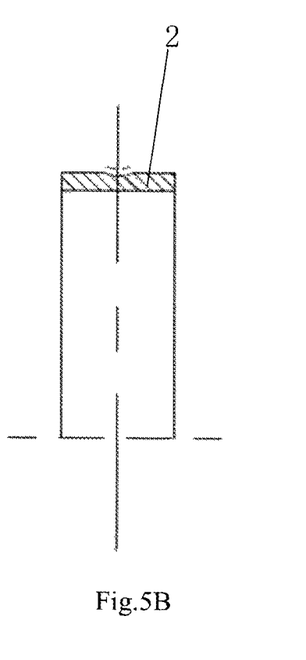
Figure 5C:
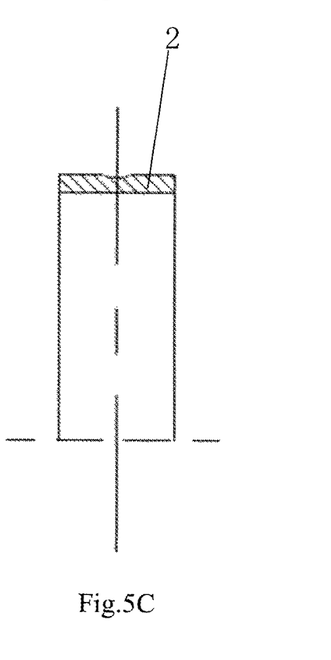

Referring to FIG. 3 to FIG. 5 comprehensively, in the illustrated embodiments 1 to 3, the following features are further defined: in the step S1, further reinforcing is performed along the radial direction of the thin-wall ring, and the reinforcing part reinforces on the outer circular surface of the thin-wall ring provided in step S0. Further, in these three embodiments, in Example 1 and Example 2, In the step S0, the thin-wall ring is provided with a raceway. In the step S3, the hard turning, grinding and superfinishing process to the reinforcing ring further includes:

grinding two end surfaces, the inner circular surface and the outer circular surface and raceway surface of the reinforcing ring;
superfinishing the raceway surface after grinded, and after that;
hart turning the outer circular surface of the reinforcing ring to remove the reinforcing part 5 of the radial reinforcement.

Further distinguishing Embodiment 1 and Embodiment 2, in Embodiment 1, what machined is the thin-wall outer ring 1; the raceway surface intersects the inner circular surface. In Embodiment 2, what machined is the thin-wall inner ring 2; the raceway surface intersects with the outer circular surface, and the reinforcing part is displaced staggered from the raceway surface.

Contrast to the first embodiment and the second embodiment, in the third embodiment, what machined is a thin-wall inner ring; in the step S0, the thin-wall ring provided has no raceway; in the step S3, the process of hard turning, grinding and superfinishing to the reinforcing rings further includes:
grinding two end surfaces, inner circular surface and outer circular surface of the reinforcing ring;
hard turning the outer surface of the reinforcing ring to remove the reinforcing part of the radial reinforcement, and hard-out a raceway surface on the outer circular surface;
superfinishing the raceway surface.

After clarifying the above differences, the specific contents of Embodiment 1 to Embodiment 3 will be described one by one below:

First Embodiment

It is a machining method of radial reinforcement of the outer ring of the thin-wall bearing.

As shown in FIGS. 3A, 3B, and 3C, FIG. 3A shows a roughcast of a thin-walled outer ring 1 before being reinforced in radial direction and finishing. FIG. 3B is a semi-finished outer ring of the radial reinforced outer ring of FIG. 3A processed through several steps. FIG. 3C shows a finished thin-wall outer ring 1 formed by machining the semi-finished outer ring of FIG. 3B. The radial reinforcement of the outer ring is to increase the outer diameter along the full width of the outer ring, and the wall thickness of the outer ring after reinforcement is 1.2 to 11 times of that before reinforcement, that is, the wall thickness of the reinforcing part is 0.2 to 10 times the wall thickness of the thin-wall ring; processing sequence is as follows:

FIG. 3A shows the radial reinforcing to the blank outer ring→1: Grinding two end surfaces→2: Grinding outer circle→3: Grinding inner circle (channel rib)→4: Grinding channel→5: Superfinishing the channel→FIG. 3B semi-finished outer ring→6: hard turning the outer circle→FIG. 3C finished thin-wall outer ring 1.

Wherein, when hard turning the outer circle, the inner circular surface of the outer ring grinded is expanded on the high-rigidity CNC hard machine tool. In a single loading, the feed amount is changed from large to small, and the radial reinforcement portion 5 of the thin-wall outer ring 1 indicated by cross lines is all hard turned by several times of cutting, and the final outer circular surface of the thin-wall bearing is obtained, and after which the outer ring is no longer subjected to any machining. It can be seen that the last formed surface is the outer circular surface of the outer ring of the thin-wall bearing. Conversely, the final process of the outer wall of the normal-wall outer ring is the superfinishing of the channel, and the last formed surface is the channel surface.

It needs six cutting process to machining a thin-wall outer ring 1 from a blank to a finished product. Before the hard turning of outer circle in the step 6, because the thin-wall outer ring 1 is radial reinforced, and wall thickness is sufficient, the processing deformation of outer ring can be avoided. For the hard turning of outer circle in the step 6, because the expansion is implemented to the inner circular surface of the outer ring, and the cutting is divided to multiple times, and the cutting amount is controlled from large to small, the deformation is also extremely small, and thin-wall outer ring 1 with accuracy level not less than P4 can be obtained.

Second Embodiment

It is a machining method of radial reinforcement of the inner ring of the thin-wall bearing.

As shown in FIGS. 4A, 4B, and 4C, FIG. 4A shows a rough cast of a thin-walled inner ring before being reinforced in radial direction and finishing. FIG. 4B is a semi-finished inner ring of the radial reinforced inner ring of FIG. 4A processed through several steps. FIG. 4C shows a finished thin-wall inner ring formed by machining the semi-finished inner ring of FIG. 4B. The radial reinforcement of the inner ring is to increase its outer diameter along the full width of the inner ring (the channel part is left with a circular arc extension vacancy), and the wall thickness of the inner ring after reinforcement is 1.2 to 11 times that before reinforcement; a processing sequence is as follows:

FIG. 4A the Radial reinforced blank of the inner ring→1: Grinding two end surfaces→2: Grinding outer circle (which is channel rib)→3: Grinding channel→4: Grinding inner circle→5: Superfinishing the channel→FIG. 4B semi-finished inner ring→6: hard turning the outer circle (which is channel rib)→FIG. 4C finished thin-wall inner ring.

Wherein, when hard turning the outer circle, the grinded inner circular surface of the inner ring is expanded on the high-rigidity CNC hard machine tool. In a single loading, the feed amount is changed from large to small, and the radial reinforcement portion of the thin-wall inner ring indicated by cross lines is all hard turned by several times of cutting, and the final outer circular surface of the thin-wall bearing is obtained, and after which the thin-wall inner ring 2 is no longer subjected to any machining. It can be seen that the last formed surface is the outer circular surface of the thin-wall inner ring 2 (which is channel rib of the inner ring). On the contrary, the final process of the inner ring with usual wall thickness is the superfinishing of the channel, and the last formed surface is the channel surface.

It needs six cutting process to machining a thin-wall inner ring 2 from a blank to a finished product. Before the hard turning of outer circle in the step 6, because the inner ring is radial reinforced, and wall thickness is sufficient, the processing deformation of the inner ring can be avoided. For the hard turning of outer circle, because the expansion is happened to the inner circular surface of the inner ring, and the cutting is operated through multiple times, and the cutting amount is controlled from large to small, the deformation is also extremely small, and thin-wall inner ring 2 with accuracy level not less than P4 can be obtained finally.

Third Embodiment

It is a machining method of radial reinforcement of the inner ring of the thin-wall bearing.

As shown in FIGS. 5A, 5B, and 5C, FIG. 5A shows a rough cast of a thin-walled inner ring with radial reinforcement and without channel before being finished. FIG. 5B is a semi-finished inner ring of the radial reinforced inner ring of FIG. 5A processed through several steps. FIG. 5C shows a finished thin-wall inner ring formed by machining the semi-finished inner ring of FIG. 5B.

It can be seen from the second embodiment that if the inner ring blank has a channel as normal, the channel extends and expands as the inner ring is radially reinforced, and the channel vacancy weakens the reinforcing strength effect. In addition, the larger the reinforcement is in a certain range, the deeper the channel is, and too deeper channel is a technical problem for grinding and superfinishing. Even when the reinforcing thickness reaches a certain level, it will diffuse over the center of the channel arc, and it is not known how to extend the arc of the channel. Therefore, considering that the channel of the thin-wall bearing ring is shallow, the inner ring blank before superfinishing has no channel in the third embodiment, and the channel was hard turned during finishing.

Since the inner ring blank has no channel, the radial reinforcement of the inner ring is increasing its outer diameter along the full width of the inner ring, and the wall thickness of the inner ring after reinforcement is 1.2 to 11 times that before reinforcement, that is, the wall thickness of the reinforcing part is 0.2 to 10 times the wall thickness of the thin-wall ring; processing sequence is as follows:

FIG. 5A the radial reinforced blank of the inner ring having no channel→1: Grinding two end surfaces→2: Grinding outer circle→3: Grinding inner circle→4: hard turning the outer circle and channel→5B: semi-finished inner ring→5: Superfinishing the channel→FIG. 5C finished thin-wall inner ring.

Wherein, when hard turning the outer circle and channel in the step 4, the inner circular surface of the inner ring grinded is expanded on the high-rigidity CNC hard machine tool. In a single loading, the feed amount is changed from large to small, and the radial reinforcement portion of the thin-wall inner ring indicated by cross lines is all hard turned by several times of cutting, and the final outer circular surface of the thin-wall inner ring is obtained. Then hard turning the channel and after which superfinishing the channel of inner ring.

It needs five cutting process to machining a thin-wall inner ring 2 from a blank to a finished product. Before the hard turning of outer circle and channel in the step 4, because the thin-wall inner ring is radial reinforced, and wall thickness is sufficient, the processing deformation of the inner ring can be avoided. For the hard turning of outer circle and channel in step 4, because the expansion is happened to the inner circular surface of the inner ring, and the cutting is operated by multiple times, and the cutting amount is controlled from large to small, the deformation is also extremely small, and thin-wall inner ring 2 with accuracy level not less than P4 can be obtained finally.

According to the first embodiment and the second embodiment, the thin-wall ring is radial reinforced by increasing the radial dimension of the outer surface of the thin-wall inner ring 2 and the thin-wall outer ring 1 to obtain a reinforced ring with radial reinforcing part. For the reinforcing ring, the wall thickness of the radial reinforcing part is 0.2 to 10 times the wall thickness of the corresponding thin-wall ring. After the two end surfaces of the ring, the inner circular surface and the raceway surface are finally formed by grinding, hard turning, and superfinishing, the inner surface of the ring is expanded and the reinforcing part is removed by hard turning to obtain the thin-wall ring required by the design. As previously stated, the difference between the third embodiment and the first two embodiments is that when the radial reinforced inner ring has no channel before the heat treatment (referred to as the radial reinforcing inner ring), and both end faces and inner circular surface are finally formed by grinding, hard turning and superfinishing, the inner surface of the ring is expanded and the reinforcing part is removed by hard turning and then hard turning to obtain a channel. Then, superfinishing the channel to obtain a thin-wall inner ring satisfied with design requirement.

Fourth Embodiment and Fifth Embodiment

Figure 6A:
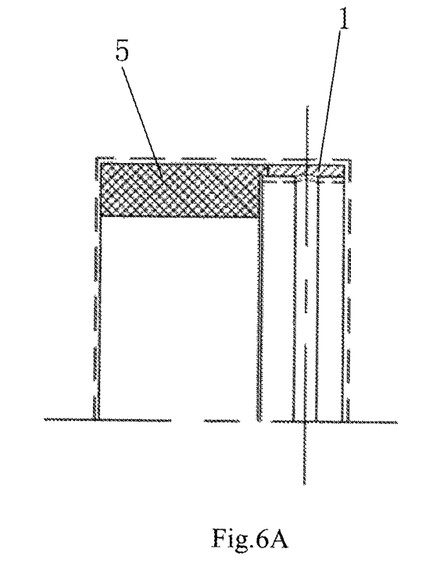
FIGS. 6A to 6C are schematic views of processing of a thin-wall outer ring of the fourth embodiment of the present invention.
Figure 6B:
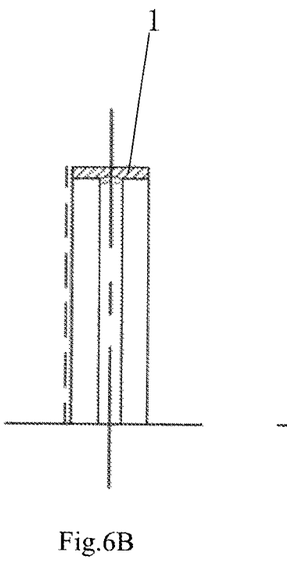
Figure 6C:
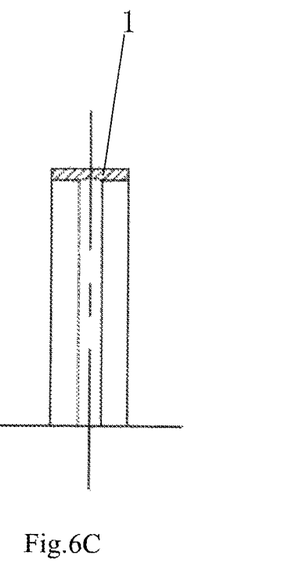
Figure 7A:
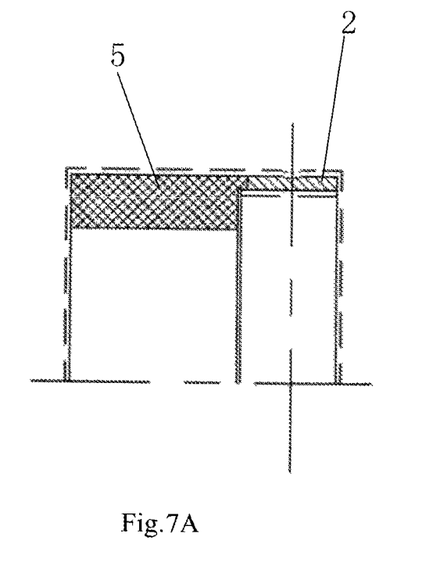
FIGS. 7A to 7C are schematic views of processing of a thin-wall inner ring of the fifth embodiment of the present invention.
Figure 7B:
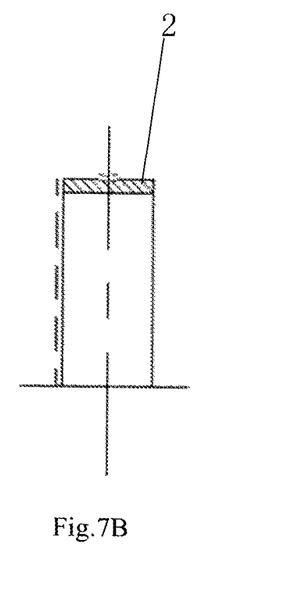
Figure 7C:
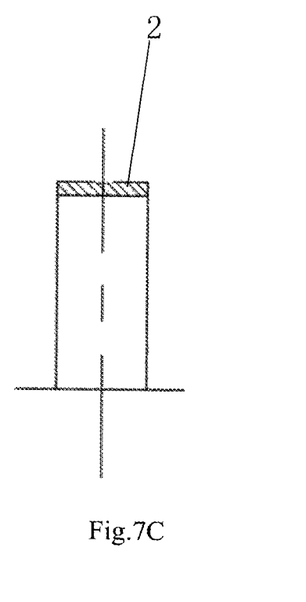

As shown in FIG. 6 and FIG. 7, the fourth embodiment and the fifth embodiment further define the following features: In the step S1, further reinforcing the thin-wall ring in the axial direction. The reinforcing part reinforces on one end face of the thin-wall ring.

Reference to the fourth embodiment and the fifth embodiment, in the step S3, the process of hard turning, grinding and superfinishing to the reinforcing ring further includes:
Grinding two end surfaces and outer circular surface of the reinforcing ring;
clamping the reinforcing part, and hard turning inner circular surface and raceway surface of the thin-wall ring;
Cutting the thin-wall ring off from the axial reinforcement part;
Grinding end face in the cutting off section of the thin-wall ring;
Superfinishing the raceway surface.

The difference between the fourth embodiment and the fifth embodiment is that the fourth embodiment illustrates a thin-wall outer ring, and the fifth embodiment illustrates a thin-wall inner ring.

After clarifying the above commonalities and differences, the specific contents of the fourth embodiment and the fifth embodiment will be described one by one below:

Fourth Embodiment

It is a machining method of axially reinforcement of the outer ring of the thin-wall bearing.

As shown in FIGS. 6A, 6B, and 6C, FIG. 6A shows a rough cast of a thin-wall outer ring being reinforced in radial direction before finishing. FIG. 6B is a semi-finished outer ring formed by hard cutting off the radial reinforced outer ring of FIG. 6A processed through several steps. FIG. 6C shows a finished thin-wall outer ring formed by machining the semi-finished outer ring of FIG. 6B. Axial reinforcement of the outer ring is to increase the body axially along one side of the outer ring. The width of the ring reinforcing part 5 is 0.2 to 10 times the width of the corresponding thin-wall outer ring 1, and the outer diameter is equal to the outer diameter of the thin-wall outer ring 1, the inner diameter is smaller than the inner diameter of the thin-wall ring. processing sequence of the axially reinforced outer ring is as follows:

FIG. 6A the radial reinforced blank of the outer ring→1: Grinding two end surfaces→2: Grinding outer circle→3: hard turning inner circle (channel rib) and channel→4: hard cutting off→FIG. 6B semi-finished outer ring→5: grinding the cutting off end face of the outer ring→6: Superfinishing the channel→FIG. 6C finished thin-wall outer ring.

Wherein, in the third sequence and the fourth sequence, hard turning and clamping the outer circular of the reinforcing part, and are completed in one time loading and positioning. Hard-cutting means cutting the thin-wall outer ring 1 off from the axial reinforcing part 5. Because the hard turning is performed by a high rigidity CNC hard machine tool, and externally-clamping the outer circular surface of the reinforcing part of the outer ring, the thin-wall outer ring does not receive any clamping force, and can be cut multiple times. The feed rate can be precisely controlled, therefore, the ring deformation is extremely small, and can obtain a processing accuracy not less than P4.

Fifth Embodiment

It is a machining method of axially reinforcement of the inner ring of the thin-wall bearing.

As shown in FIGS. 7A, 7B, and 7C, FIG. 7A shows a rough cast of a thin-wall inner ring being reinforced in radial direction before finishing. FIG. 7B is a semi-finished inner ring formed by hard cutting off the radial reinforced inner ring of FIG. 6A processed through several steps. FIG. 7C shows a finished thin-wall inner ring formed by machining the semi-finished inner ring of FIG. 6B. Axial reinforcement of the inner ring 2 is to increase the body axially along one side of the inner ring. The width of the ring reinforcing part 5 is 0.2 to 10 times the width of the corresponding thin-wall ring, and the outer diameter of the reinforcing part 5 is equal to the outer diameter of the thin-wall ring. The inner diameter is smaller than the inner diameter of the thin-wall ring. The axially reinforced inner ring processing sequence is as follows:

FIG. 7A the radial reinforced blank of the inner ring→1: Grinding two end surfaces→2: Grinding outer circle→3: hard turning inner circle and channel→4: hard cutting off→FIG. 7B semi-finished inner ring→5: grinding the cutting off end face of the inner ring→6: Superfinishing the channel→FIG. 7C finished thin-wall inner ring.

Wherein, in the third sequence and the fourth sequence, hard turning and clamping the outer circular surface of the reinforcing part, and are completed in one time loading and positioning. Hard-cutting means cutting the thin-wall inner ring 2 off from the axial reinforcing part 5. Because the hard turning is performed by a high rigidity CNC hard machine tool, externally-clamping the grinded outer circular surface of the reinforcing part of the inner ring, the thin-wall inner ring 2 does not receive any clamping force, and can be cut multiple times. The feed rate can be precisely controlled, therefore, the ring deformation is extremely small, and can obtain a processing accuracy not less than P4.

According to the fourth and the fifth embodiment, the thin-wall ring is radial reinforced by increasing the radial dimension in one side of the thin-wall inner ring 2 and the thin-wall outer ring 1 to obtain a reinforced ring with a radial reinforcing part 5. For the reinforcing ring, the width of the reinforcing part 5 of the radial reinforcing ring is 0.2 to 10 times the width of the corresponding thin-wall ring. The outer diameter of the reinforcing part is equal to the outer diameter of thin-wall ring, and the inner diameter is smaller than that of the thin-wall ring. Grinding both ends and outer surfaces of the axial reinforcement ring, clamping the outer circular surface of the reinforcing part, and finishing the hard turning of the outer circular surface, inner circular surface, channel surface and one end surface facing outward of the thin-wall ring in one time loading and positioning, and hard cutting the thin-wall ring off from the reinforcing part, and then grinding the cut off end face of the thin-wall ring, superfinishing the channel surface to obtain the thin-wall rings according to the design requirements.

Seventh Embodiment and Eighth Embodiment

Figure 9A:
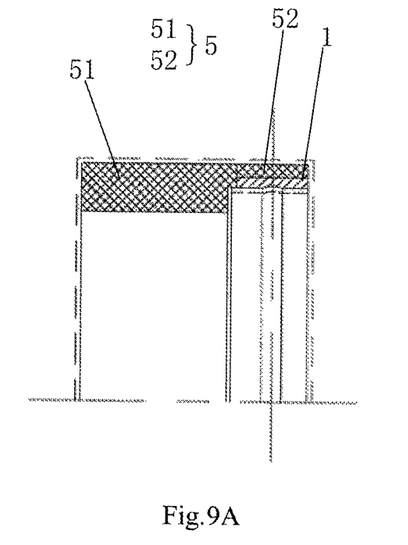
FIGS. 9A to 9C are schematic views of processing of a thin-wall outer ring of the seventh embodiment of the present invention.
Figure 9B:
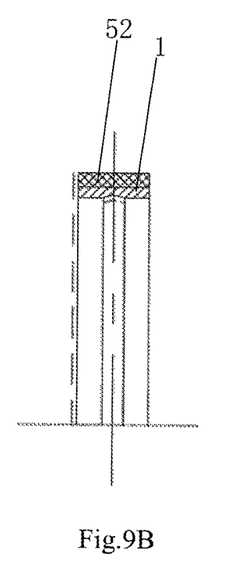
Figure 9C:
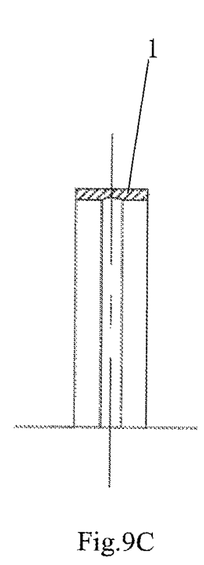
Figure 10A:
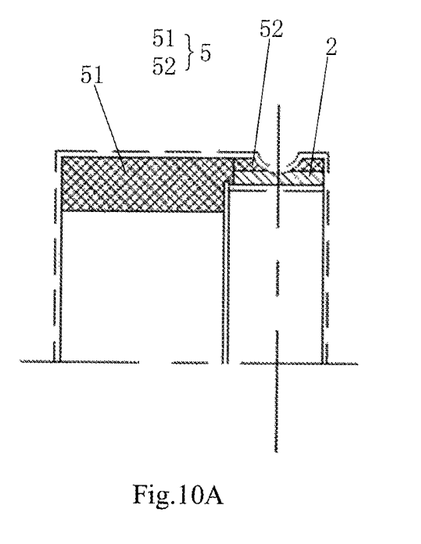
FIGS. 10A to 10C are schematic views of processing of a thin-wall inner ring of the eighth embodiment of the present invention.
Figure 10B:
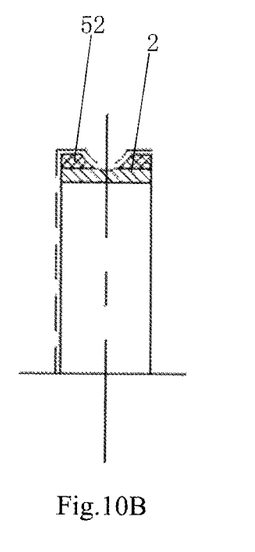
Figure 10C:
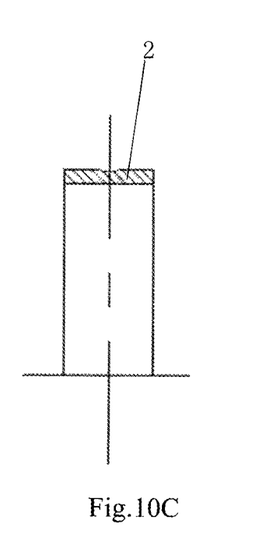

In connection with the five embodiments said above, in the seventh and eighth embodiments illustrated in FIGS. 9 and 10, a combination of radial reinforcement and axial reinforcement is made, which further defines the following features:

In the step S1, the reinforcement is performed simultaneously along the radial and axial directions of the thin-wall ring. The reinforcing part includes a radial reinforcing part 52 and an axial reinforcing part 51. The radial reinforcing part 52 is located on the outer circular surface of the thin-wall ring, and the axial reinforcing part 51 is located on one end surface of the thin-wall ring.

Furthermore, during the process of removing the reinforcing part, the axial reinforcing part 51 is firstly removed and then the radial reinforcing part 52 is removed.

In the step S3, the process of hard turning, grinding and superfinishing to the reinforcing rings further includes:
Grinding two end surfaces and outer circular surface of the reinforcing ring;
dividing the reinforcing ring into an axial reinforcing part and a remaining radial reinforcing ring; clamping the axial reinforcing part, and hard turning inner circular surface and raceway surface of the radial reinforcing ring. In addition, radial reinforcing ring is defined to include a radial reinforcing part, thin-wall ring, and machining allowances. In other alternatives of the present invention, they are not limited thereto. The definition here is only described to separately from the axial reinforcing part in order to describe the clamping process clearly;

Hard cutting the radial reinforcing ring off from the axial reinforcing part;
Grinding end surface in the cutting off section of the radial reinforcing ring;
Superfinishing the raceway surface;
Hard turning the outer circular surface, and removing the radial reinforcing part.

The seventh embodiment illustrated in FIG. 9 describes that the process said above acts on the thin-wall outer ring 1. The eighth embodiment illustrated in FIG. 10 describes that the process said above acts on the thin-wall inner ring 2. After clarifying the above commonalities and differences, the specific contents of the seventh and eighth embodiments will be described one by one below:

Seventh Embodiment

It is a machining method of bi-directional reinforcement of the outer ring of the thin-wall bearing.

As shown in FIGS. 9A, 9B, and 9C, FIG. 9A shows a rough cast of a thin-wall outer ring being reinforced in radial and axial direction before finishing. FIG. 9B is a semi-finished outer ring formed by hard cutting off the bi-directional reinforced outer ring of FIG. 9A after processed through several steps. FIG. 9C shows a finished thin-wall outer ring formed by machining the semi-finished outer ring of FIG. 9B. Bi-directional reinforcement of the thin-wall outer ring 1 is to reinforce the outer ring along one side axial and radial direction simultaneously. The radial reinforcement method and the dimensions are the same as those in the first embodiment. The axial reinforcement method and the dimensions are the same as those of the fourth embodiment. The processing sequence of the bi-directional reinforcing outer ring is as follows:

FIG. 9A bi-directional reinforced blank of the outer ring→1: Grinding two end surfaces→2: Grinding outer circle→3: hard turning inner circle (channel rib of outer ring) and channel→4: hard cutting off→FIG. 9B semi-finished outer ring→5: grinding the cutting off end surface→6: Superfinishing the channel→7: hard turning the outer circular surface→FIG. 9C finished thin-wall outer ring.

It can be seen that after axial reinforcement, the thin-wall outer ring 1 can clamp and hold the outer circular surface of the axial reinforcement part, and hard turning the inner circle and the channel of the outer ring radial reinforced, then hard cutting the radial reinforced outer ring off from the axial reinforcement part. At this point, the process is the same as that of the outer ring that is axially reinforced in the fourth embodiment. However, because the ring of the present embodiment is radially reinforced, in the process of hard turning and hard cutting, the rigidity of the workpiece is better and a higher precision of the hard turning than in the fourth embodiment can be obtained, and the deformation of the ring after being cut is also smaller. In addition, in the subsequent process of grinding the end surface and superfinishing the channel, because of the radial reinforcement of the ring, the machining efficiency and accuracy obtained in these two processes are also higher than those in the fourth embodiment.

Compared with the radial reinforcement process of the first embodiment, the thin-wall outer ring 1 of the present embodiment can be grinded or hard turned because of radial reinforcement and obtaining a clamping portion for hard turning. While the ring of the first embodiment is too narrow, it only can be machined by grinding.

Therefore, in this embodiment, the bi-directional reinforcing process method for the outer ring of the thin-wall bearing not only has the advantages of radial reinforcement of the first embodiment, but also has the advantages of the axially reinforcement of the fourth embodiment. The finishing methods can be chose flexibly, and the ring can obtain higher processing accuracy.

It can be seen that the last formed surface is the outer peripheral surface of the thin-wall outer ring 1. It is different from the machining process of the out ring with normal wall thickness. The last step of the outer ring with normal-wall thickness is superfinishing the channel, and the last formed surface is the channel surface.

Eighth Embodiment

It is a bi-directional reinforcing machining method for the inner ring of the thin-wall bearing.

As shown in FIGS. 10A, 10B, and 10C, FIG. 10A shows a rough cast of a thin-wall inner ring being reinforced in radial and axial direction before finishing. FIG. 10B is a semi-finished inner ring formed by hard cutting from the bi-directional reinforced inner ring of FIG. 10A processed through several steps. FIG. 10C shows a finished thin-wall inner ring formed by machining the semi-finished inner ring of FIG. 10B. Bi-directional reinforcement of the thin-wall inner ring 2 is to reinforce the inner ring along one side axial and radial direction simultaneously. The radial reinforcement method and the dimensions are the same as those in the second embodiment. The axial reinforcement method and the dimensions are the same as those of the fifth embodiment. The processing sequence of the bi-directional reinforcing inner ring is as follows:

FIG. 10A bi-directional reinforced blank of the inner ring→1: Grinding two end surfaces→2: Grinding outer circle→3: hard turning inner circle and channel→4: hard cutting off→FIG. 10B semi-finished inner ring→5: grinding the cutting off end surface→6: Superfinishing the channel→7: hard turning the outer circle→FIG. 10C finished thin-wall inner ring.

It can be seen that after axial reinforcement of the thin-wall inner ring, the outer circular surface of the axial reinforcement portion 51 can be n clamp and hold, and hard turning the inner circle and the channel of the inner ring radial reinforced, then hard cutting the radial reinforced inner ring off from the axial reinforcement part. At this point, the process is the same as that of the inner ring that is axially reinforced in the fifth embodiment. However, since the ring of the present embodiment is radially reinforced, in the process of hard turning and hard cutting, the rigidity of the workpiece is better and a higher precision of the hard turning than in the fifth embodiment can be obtained, and the deformation of the ring after being cut is also smaller. In addition, in the subsequent process of grinding the end surface and superfinishing the channel, because of the radial reinforcement of the ring, the machining efficiency and accuracy obtained in these two processes are also higher than those in the fifth embodiment.

Compared with the radial reinforcement process of the second embodiment, the inner ring of the present embodiment can be grinded or hard turned because of radial reinforcement and obtaining a clamping portion. While the ring of the second embodiment is too narrow, it only can be machined by grinding because the ring is too narrow.

Therefore, in this embodiment, the bi-directional reinforcing machining process for the thin-wall inner ring 2 not only has the advantages of radial reinforcement machining method of the thin-wall bearing inner ring of the second embodiment, but also has the advantages of the axially reinforcement of the fifth embodiment. The finishing methods can be chose flexibly, and the ring can obtain higher processing accuracy.

It can be seen that the last formed surface is the outer peripheral surface (channel rib) of the thin-wall inner ring 2. It is different from the machining process of the inner ring with normal wall thickness. The last step of the inner ring with normal-wall thickness is superfinishing the channel, and the last formed surface is the channel surface.

According to the seventh and the eighth embodiment, the thin-wall ring is radial and axial bidirectional reinforced by increasing the radial dimension and one side axial dimension of outer circular surface of the thin-wall inner ring 2 and the thin-wall outer ring 1 to obtain a bi-directionally reinforced ring. For the reinforcing ring, the wall thickness of the radial reinforcement part is 0.2 to 10 times the wall thickness of the thin-wall ring, and the width of the axial reinforcement is 0.5 to 10 times the width of the thin-wall ring, and the outer diameter is equal to that of the thin-wall ring after radial reinforcement, and the inner diameter is equal to or smaller than that of the thin-wall ring. Grinding both ends and outer surfaces of the bi-directional reinforcement ring, clamping the outer circular surface of the axial reinforcement portion, and finishing the hard turning of the outer circular surface, inner circular surface, channel surface and one end facing outward of the bi-directional reinforcement ring in one time loading and positioning, and hard cutting the radial reinforcement ring off from the axial reinforcement portion, and then grinding the cut off end face of the radial reinforcement ring after hard cutting, and superfinishing the channel surface, expand the inner circular surface, hard turning the radial reinforcement part, to obtain the thin-wall rings satisfied with the design requirements.

Sixth Embodiment

As shown in FIG. 8, the present embodiment is an improvement of the fourth and fifth embodiment, and provides a method for machining a thin-wall inner ring/outer ring of a thin-wall bearing, which comprising the following steps:

S00: Providing a thin-wall ring group containing at least two thin-wall rings with a machining allowance. In the thin-wall ring group, each thin-wall ring is arranged in the axial direction successively, and two adjacent thin-wall rings are connected by a connecting part;

S10: reinforcing axially along one side of the thin-wall ring group to form a reinforcing ring group; In a specific alternative solution of the present invention, reinforcing the ring axially along one side of the first ring of the rough ring, the other side of the first ring is connected to another ring in the axial direction through a connecting part, and the other rings are connected in sequence along the axial direction through the connecting part;

S20: performing a quenching and tempering heat treatment on the reinforcing ring group obtained in step S10;

S30: Grinding, hard turning and superfinishing the heat-treated reinforcing ring group, and including removing the machining allowance and the axial reinforcing part 5 and the connecting section 6 obtained by reinforcement in step S10 to obtain a corresponding number of finished thin-wall rings.

Wherein in the said step S30 of the present embodiment, the process of hard turning, grinding and superfinishing to the reinforcing ring group further includes:

Grinding two end surfaces and outer circular surface of the reinforcing ring group;

clamping the axial reinforcing part, and hard turning inner circular surfaces and raceway surfaces of the thin-wall ring group;

Hard cutting each thin-wall ring off from the connecting part or the axial reinforcing part;

Grinding end face in the cutting off section of each thin-wall ring;

Superfinishing the raceway surface.

Sixth Embodiment

It is an axial reinforcing machining method of the thin-wall bearing with two row of outer rings.

Figure 8A:
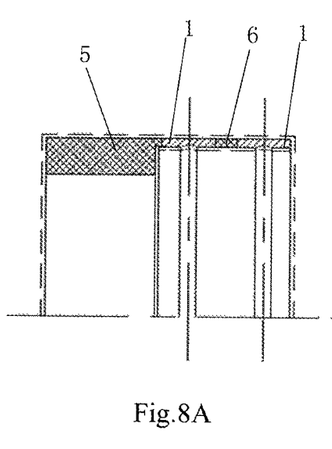
FIGS. 8A to 8E are schematic views of processing of a thin-wall outer ring of the sixth embodiment of the present invention.
Figure 8B:
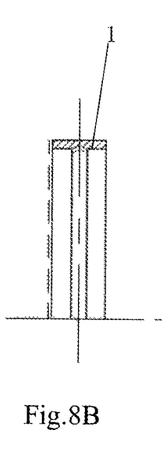
Figure 8C:
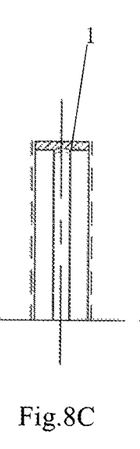
Figure 8D:
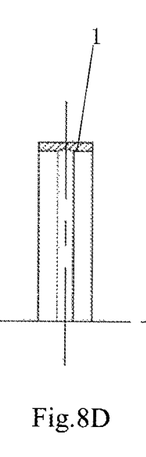
Figure 8E:
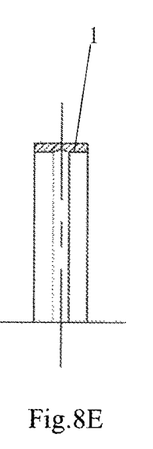

As shown in FIGS. 8A, 8B, 8C, 8D, and 8E, FIG. 8A shows a rough cast of a thin-wall outer ring in a two row structure being reinforced in axial direction before finishing. FIG. 8B is a semi-finished outer ring formed by hard cutting off the outside of the reinforced outer ring group shown in FIG. 8A processed through several steps. FIG. 8C is a semi-finished outer ring formed by hard cutting off the inner side of the reinforced outer ring group shown in FIG. 8A processed through several steps. FIG. 8D shows a finished outer ring 1 formed by machining the semi-finished outer ring shown in FIG. 8B. FIG. 8E shows a finished outer ring 1 formed by machining the semi-finished outer ring shown in FIG. 8C. The axial reinforcement method and the dimensions of the outer ring are the same as that of the fourth embodiment. The difference is that the axial reinforcing outer ring of the present embodiment is designed as a double row structure on the process, and finally two thin-wall outer rings can be machined from one axial reinforcing part, thus improves the processing efficiency and material utilization. The specific processing sequence is as follows:

FIG. 8A the axially reinforced blank of the outer ring with a two row structure→1: Grinding two end surfaces→2: Grinding outer circle→3: hard turning inner circle (channel rib) and two row of channel→4: hard cutting off two times→FIG. 8B and FIG. 8c two semi-finished outer rings→5: grinding the cutting off end of outer ring→6: Superfinishing the channel→FIG. 8D and FIG. 8E: two finished thin-wall outer rings.

Wherein, hard turning the outer circular surfaces of the clamping reinforcing portion 5 in steps 3 and step 4 is finished in one time of loading and locating. Hard cutting means cutting the thin-wall ring 1 off from the connecting part 6 located between two rings or the axial reinforcing part 5. As shown in FIG. 8B, firstly hard cutting the outer (ie, away from the axial reinforcing portion 5) thin-wall ring 1, one cutting end surface needs to be grinded. As shown in FIG. 8c, secondly hard cutting the inner (ie, close to the axial reinforcing portion 5) thin-wall ring 1, two cutting end surfaces need to be grinded.

Because the hard turning is performed by a high rigidity CNC hard machine tool, and externally clamping the grinded outer circular surface of the axial reinforcing part of the outer ring, the thin-wall outer ring does not receive any clamping force, and can be cut multiple times. The feed rate can be precisely controlled, therefore, the ring deformation is extremely small, and can obtain two finished thin-wall outer ring 1 with an accuracy which is not less than P4.

The axial reinforcing machining method for the thin-wall bearing outer ring in a three or more row structure is similar to that of the outer ring in two row structure. No additional embodiments will be given. In other words, this embodiment provides a method for the outer ring in two row structure, for other outer ring in more than two row structure, its principle is similar and fall within the scope of the present invention even if do not detail explained. Similarly, the axial reinforcing machining method for the thin-wall inner ring 2 with N (N≥2) row of channel is similar to that of the outer ring, and no additional embodiments will be given.

As for the dimensions, it should also be pointed out that in this present embodiment, the width of the axial reinforcing part 5 is 0.2 to 10 times the width of a single thin-wall ring of one ring group, and the inner diameter is smaller than the inner diameter of the thin-wall ring, and the outer diameter is same as that of the thin-wall ring; The width of the connecting part is 1 to 5 mm, and the outer diameter is less than or equal to the outer diameter of the thin-wall ring, and the inner diameter is greater than or equal to the inner diameter of the thin-wall ring.

In view of the above description, this embodiment designs the single row thin-wall bearing ring ring as an N-row (N≥2) structure. The inner diameter, outer diameter, and raceway size of the N-row thin-wall ring are same as that of the single row thin-walled bearing ring. The width is equal to N times of the width of the single-row thin-wall bearing ring plus the width of (N−1) connecting parts (cutting edges), and the N-row thin-walled ring shares one axial reinforcing part and the dimensional parameters of the axial reinforcing part are the same as that of the axial reinforcing part said above. The processing method for the N-row thin-wall rings is the same as that of the axial reinforcing part said above. After the machining is completed, N thin-wall rings are obtained by hard cutting, and the machining process of the thin-wall ring after being cut is same as that of the axial reinforcing part said above. Finally, N thin-wall rings satisfied with the design requirements are obtained.

Ninth Embodiment

The present embodiment can be considered as a further improvement of the eighth embodiment and introduces the radial reinforcing part 52 into the ring in multi-row structure. In the said step 10, further includes:
Reinforcing each thin-wall ring in the radial direction, and forming a radial reinforcing part on the outer circular surface of the thin-wall ring;
In the step S30, the process of hard turning, grinding and superfinishing the ring further comprises:
grinding double end surfaces and outer circular surface of the reinforcing ring group;
Dividing the reinforcing ring group into an axial reinforcing part and a remaining radial reinforcing ring group, and clamping the axial reinforcing part, and hard turning inner circular surface and raceway surface; In the optional definition of the present invention, the radial reinforcing ring group is defined as a section including reinforcing rings, connecting parts, and machining allowances. Of course, this may also be not limited thereto. The radial reinforcing ring is only conceptually separated from the axial reinforcing part to describe the process of the clamping process clearly. Hard cutting each radial reinforcing ring of the radial reinforcing ring group off from the connecting portion 6 or the axial reinforcing portion 51; The radial reinforcing ring group is optionally defined as including each radial reinforcing ring and connecting part; The radial reinforcing ring can be further defined as a thin-wall ring with a radial reinforcing part, of course, there are processing allowances on it;
Grinding the cutting off end surface of each radial reinforcing ring;
Superfinishing the raceway surface;
Hard turning the outer surface and removing the radial reinforcing part 52.

Figure 11A:
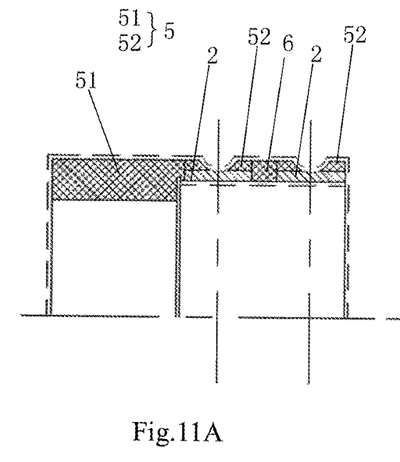
FIGS. 11A to 11E are schematic views of processing of a thin-wall inner ring of the ninth embodiment of the present invention.

Of course, the dimensions of the radial reinforcing part 52 and the axial reinforcing part 51 are the same as that of the previous embodiments. The wall thickness of the radial reinforcing part 52 is 0.2 to 10 times the wall thickness of the thin-wall ring 1 or 2. The outer diameter of the axial reinforcing part 52 is equal to outer diameter of the thin-wall ring radially reinforced.

Specifically, the present embodiment is actually a bi-directional reinforcing machining method for the thin-wall bearing inner ring which is in a two row structure.

Figure 11B:
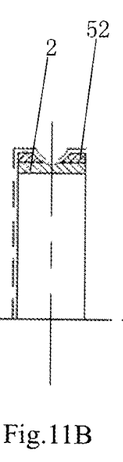
Figure 11C:
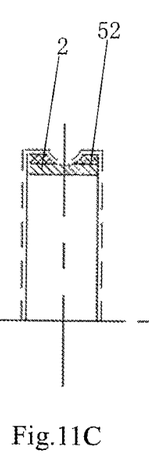
Figure 11D:
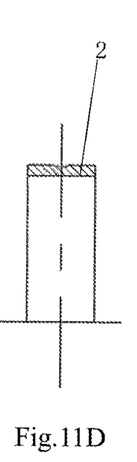
Figure 11E:
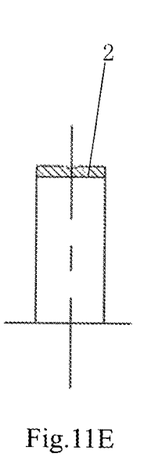

As shown in FIGS. 11A, 11B, 11C, 11D, and 11E, FIG. 11A shows a rough cast of a thin-wall inner ring in a two row structure being reinforced in radial and axial direction before finishing. FIG. 11B is a semi-finished inner ring formed by hard cutting off the outside of the inner ring of FIG. 11A processed through several steps. FIG. 11C shows a semi-finished inner ring formed by hard cutting off the inside of the inner ring of FIG. 11A processed through several steps. FIG. 11D is a finished thin-wall inner ring formed by machining the semi-finished inner ring of FIG. 11B. FIG. 11E is a finished thin-wall inner ring formed by machining the semi-finished inner ring of FIG. 11C.

The bi-directional reinforcement method and the dimensions of the reinforcing part of the inner ring in the present embodiment are the same as that of the eighth embodiment. The difference is that the bi-directional reinforcing inner ring of the present embodiment is designed as a double row structure, and finally two thin-wall inner rings can be machined from one axial reinforcing part, thus improves the processing efficiency and material utilization. The specific processing sequence is as follows:

FIG. 11A the bi-directionally reinforced blank of the inner ring→1: Grinding two end surfaces→2: Grinding outer circle→3: hard turning the inner circle and two row of channels→4: hard cutting off two times→FIG. 11B and FIG. 11c: two semi-finished inner rings→5: grinding the cutting off end surfaces of inner ring→6: Superfinishing the channel→7: hard turning the outer circular surface→FIG. 11D and FIG. 11E: two finished thin-wall inner rings.

Wherein, hard turning the outer circular surfaces of the clamping reinforcing part in steps 3 and 4 is finished in one time of loading and locating. Hard cutting means cutting the radial reinforcing ring part off from the connecting part 6 or the axial reinforcing part 5. As shown in FIG. 11B, firstly, hard cutting the radial reinforcing inner ring away from the axial reinforcing part, then one cutting end needs to be grinded. As shown in FIG. 11c, secondly hard cutting the radial reinforcing inner ring close to the axial reinforcing part, then two cutting ends need to be grinded.

Two radially reinforced inner rings are obtained by hard cutting off from the axial reinforcing part. The subsequent processing methods for these two radial reinforcing inner rings are the same as that in the eighth embodiment, and finally, two thin-wall inner rings with an accuracy grade which is not less than P4.

Reference to the present embodiment, the single row radial reinforcing bearing ring is designed as an N-row (N≥2) structure. The inner diameter, outer diameter, and raceway size of the N-row radial reinforcing ring are same as that of the single row radial reinforcing ring. The width is equal to N times of the width of the single-row radial reinforcing ring plus the width of (N−1) connecting parts (cutting edges), and the N-row radial reinforcing rings share one axial reinforcing part and the dimensional parameters of the axial reinforcing part are the same as that of the bi-directional reinforcing part said above. The processing method for the N-row bi-directional of radial and axial reinforcing rings is the same as that of the bi-directional reinforcing part said above. After the machining is completed, N radial reinforcing rings are obtained by hard cutting, and the machining process of the radial reinforcing ring after being cut is same as that of the bi-directional reinforcing part said above. Finally, N thin-wall rings satisfied with the design requirements are obtained.

Referring comprehensively to the above embodiments, the reinforcing machining method for the thin-wall ring said above is suitable for the thin-wall rolling bearings of all types, all sizes, and all materials. The machining method does not exclude taking the traditional accuracy improving processing measures and methods such as additional tempering in the middle of the process, and pre-finishing the outer surface of the outer ring before superfinishing the outer ring raceway to further improve the process accuracy of the ring. Compared with the thin-wall bearing rings before reinforcement, the machining process of the thin-wall bearing rings after reinforcement is obviously different in terms of processing methods, processing sequence, the order of the final molding of surfaces of the rings, and the rigidity of the processing system. It eventually led to a qualitative leap in machining efficiency and machining accuracy.

The reinforcement of the reinforcing machining method of the thin-wall bearing ring begins with the initial feeding of blanks. The wall thickness of the radial reinforcing ring is reinforced to close to the wall thickness of normal bearing. The wall thickness of the reinforcing part of the axially-reinforced ring equals or exceeds the wall thickness of the normal bearing ring and the width of the reinforcing part is sufficient for clamping. The radial and axial bi-directional reinforcing rings are reinforced in both radial and axial directions. Because the ring is reinforced from the blank feeding, so it has the advantages of quality and efficiency in all stages of the manufacturing process:

(1) During the machining stage of the ring blank, since the ring is reinforced to non thin-wall ring, the clamping deformation of the thin-wall ring can be avoided, so that the ring can be turned by the normal process and the fixture. In this manner, not only the turning processing efficiency can be improved, the scrap rate can be reduced, and the turning accuracy of the ring billet can be greatly improved, which has laid a very good precision foundation for the post-process heat treatment and the precision machining after the heat treatment;

(2) In the heat treatment stage of the ring, since the ring is reinforced, even if no special anti-deformation measures are taken, the heat treatment deformation of the ring can also be controlled within an appropriate range, which not only improves the efficiency of the heat treatment process, but also the small heat treatment deformation is very beneficial to the improvement of the precision machining accuracy after the heat treatment and the shape and performance control of the machining surface;

(3) In the grinding, hard turning and superfinishing phases after heat treatment, the rings have a high accuracy foundation due to the reinforcement of the rings and the scientific scheduling of processing methods and sequence in the finishing process, the clamping and grinding of the thin-wall elements in the machining process can be completely avoided. Therefore, not only obtains extremely high machining accuracy, but also reduces processing steps and cost.

The clamping or cutting deformation of the thin-wall ring is avoided or greatly reduced after the ring is reinforced. Therefore, in addition to the reinforced surface, the amount of each process margin of other surfaces can be significantly reduced relative to the thin-wall ring. The processing efficiency can be improved. The reinforcing part is removed by hard turning with a high rigidity CNC machine tool. Because the cutting rate of hard turning is far more than that of grinding, the process time taken by the material removal of the reinforcing part is controllable. Moreover, after being designed, the axial reinforcing part clamped during hard turning can be produced to a bearing ring of similar size or other useful ring-shaped parts. Thus, the waste of the axial reinforcing part can be avoided.

When expanding the inner surface (it is the inner diameter surface for the inner ring, and it is the raceway rib for the outer ring) of the radial or bi-directional reinforcing ring in hard turning machine to hard turn the outer circular surface and the exposed raceway surface (the inner ring raceway surface), because the thin-wall bearing ring is very narrow, in order to improve the processing efficiency, multiple rings can be installed at one time to realize One-time loading for hard turning of multiple ring outer circular surfaces and exposed raceway surfaces.

The working surface of the ring contacting with the rolling body is called a raceway or a raceway surface in the present invention. The raceway includes a grooved raceway and a non-ditched raceway. The grooved raceway is for a ball bearing, such as deep groove ball bearings, shallow groove ball bearings, angular contact ball bearings, thrust ball bearings, thrust angular contact ball bearings, three-point contact ball bearings, four-point contact ball bearings, equal section thin-wall ball bearings, flexible bearings, etc.; The non-ditched raceways are for roller bearings such as cylindrical roller bearings, tapered roller bearings, spherical roller bearings, barrel roller bearings, needle roller bearings and the like. All these bearings have their corresponding thin-wall structures, i.e. thin-wall bearing. The embodiments are all ball bearings, which makes the common points and differences between different embodiments more clear, but in no way means that the thin-wall bearings only have ball bearings. It is not difficult to imagine any thin-wall bearing ring reinforcement machining method and thin-wall bearing manufacturing method from the thin-wall ball bearing reinforcement processing example. Therefore, the reinforcement machining method for ring can be used to manufacture thin-wall bearings of all types and sizes, especially precision thin-wall bearings.

Tenth Embodiment

The present invention further provides a method for manufacturing a precision thin-wall bearing, including:
Firstly, producing the thin-wall outer ring and inner ring by the machining methods of the said embodiments of the present invention;
Then, sorting and assembling the thin-wall inner ring, the thin-wall outer ring and the finished rolling elements, and placing the retainer and assembling into a complete thin-wall bearing.

Figure 12:
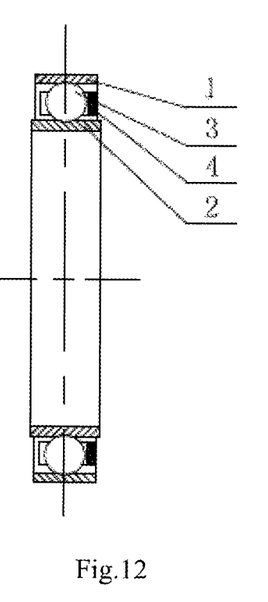
FIG. 12 is a schematic view of thin-walled bearings in various alternative embodiments of the present invention.

The thin-wall bearing comprises a thin-wall outer ring 1, a thin-wall inner ring 2, a rolling element 3 and a retainer 4 which are embedded between the outer ring raceway and the inner ring raceway.

This embodiment takes the precision thin-wall ball bearing shown in FIG. 12 as an example to provide a specific manufacturing method as follows:

(1) producing a precision thin-wall outer ring 1 with an accuracy grade not less than P4 in any one of the outer ring reinforcement processing methods of the first, the fourth, the sixth and the seventh embodiments; producing a precision thin-wall inner ring 2 with an accuracy grade not less than P4 in any one of the inner ring reinforcement processing methods of the second, the third, the fifth, the eighth and the ninth embodiments;

(2) Measuring the groove diameters of the precision thin-wall outer ring 1 and the precision thin-wall inner ring 2 and dividing them into different groups, and choose and match the ceramic ball or steel ball with an accuracy grade not less than G5 according to design clearance, and assembling.

(3) Inserting a crown-shaped plastic or a clip-on bakelite retainer 4 with a locking amount on pocket to finish the assembling of a set of precision thin-wall bearings, and obtain a precision thin-wall bearing with an accuracy grade not less than P4.

Eleventh Embodiment

Referring to the processing methods and the manufacturing methods of the ten embodiments said above, the present invention further provides a precision flexible bearing which is a single row ball bearing as shown in FIG. 12. The wall thicknesses of the outer ring and the inner ring of the bearing are 0.014 to 0.023 times the outer diameter of the outer ring of the bearing. The outer ring and the inner ring of the bearing have a grooved raceway respectively. Wherein, the bearing accuracy grade is not less P4. The bearing inner ring is a flexible inner ring, and the bearing outer ring is a flexible bearing outer ring. It is manufactured in the following manufacturing process:
Producing the flexible bearing outer ring and inner ring with an accuracy rating of not less than P4 grade by any of the optional machining method of present invention;
Selecting a ball with precision grade of not less than G5, sorting and assembling the flexible bearing inner ring, the flexible bearing outer ring and the balls; then placing the retainer and assembling into a precision and flexible bearing with a precision grade of not less than P4.

The method for manufacturing the thin-wall bearing formed by ring reinforcing machining can produces thin-wall rolling bearings of various types, various materials, various sizes, various accuracy grades, various lubrication methods, and different number of raceways, typically, RV deceleration bearings, harmonic reducer bearings, cross-cylindrical roller bearings, equal section thin-wall bearings and others. The core of which is the reinforcement machining of the thin-wall ring of the thin-wall bearing, through reinforcement, the clamping and cutting deformation can be greatly reduced or even completely avoided during cutting, heat treatment, surface treatment and other manufacturing processes, thereby greatly improves manufacturing accuracy and production efficiency of the ring.

Ring reinforcement includes radial reinforcement, axial reinforcement and bi-directional reinforcement. It is determined according to the specific conditions of the thin-walled ring and the machine tool and fixture resources owned by the company. In an embodiment, for a radial reinforcing ring, a radial reinforcing part is removed by hard turning after expanding the inner circular surface; for an axial reinforcing ring, the ring is hard cut off from the axial reinforcing part by clamping the outer circular surface of the axial reinforcing part. The actual method for clamping and processing is not limited to this. For example, the hard turning and hard cutting can be finished by magnetic attracting the end face of the reinforcing ring. In particular, for axial and bi-directional reinforcing rings, there are axial reinforcing parts for magnetizing or clamping. It is possible to hard turn all or part of the total surfaces of the rings (end face, outer circular surfaces, inner circular surfaces, raceway surfaces, raceway ribs, oil sumps, flanges, etc.) in one clamping, no matter whether these surfaces have been grinded or not. Of course, for the axially reinforced thin-wall rings, after the ring section has undergone a certain machining process, the ring section can also be cut off from the axial reinforcing section by means of the grinding wheel, except that the cutting accuracy is lower than the hard turning accuracy. Since the hard turning can be used for the profiling processing of the tool tip, the reinforcing and processing method for the non-channel type thin-wall ring of the thin-wall roller bearing is the same as or similar to that of the groove-shaped thin-wall ball bearing ring provided in the embodiment. Part of cutting method and cutting sequence for the thin-wall bearing ring after reinforcement maybe different form that of the embodiments of the present invention, but it is not a denial of the reinforcing machining method for the thin-wall bearing ring, the producing method for the thin-wall bearing, and the precision flexible bearing.

Compared with the method for manufacturing a thin-wall bearing with no reinforcement of the ring, the method for manufacturing a thin-wall bearing by reinforcing a ring can manufactures a thin-wall bearing with a higher accuracy and a lower cost, has dual advantages of high precision and low cost. Of course, the thinner the ring wall is, the more obvious the advantage of the method of manufacturing thin-wall bearing by reinforcing machining in improving the precision and reducing the cost is. Therefore, this method is most suitable for the production of ultra-thin-wall precision flexible bearings, and then is suitable for precision thin-wall bearing such as equal section thin-wall bearings and cross-sectional thin-wall roller bearings. Of course, it is also suitable for the production of ultra-light precision bearings, where the thickness of the ring is not too thick.

The above disclosure is only a few specific embodiments of the present application, but the present application is not limited thereto. Any changes that can be considered by those skilled in the art should fall within the protection scope of the present application.

The invention claimed is:

1. A method for machining a thin-wall inner ring/outer ring of a thin-wall bearing, comprising the following steps:
   S0: providing a thin-wall ring with machining allowances;
   S1: reinforcing the thin-wall ring in a radial and/or axial direction, so as to obtain a ring blank with allowances and reinforcement, hereinafter referred to as a reinforcing ring;
   S2: carrying out turning, quenching and tempering heat treatment to the reinforcing ring, and obtaining a heat-treated reinforcing ring;
   S3: grinding, hard turning and superfinishing the heat-treated reinforcing ring to remove the machining allowance and a reinforcing part obtained by reinforcement in the step S1, thereby obtaining a finished thin-wall ring which is free of the reinforcement.

2. The method for machining a thin-wall inner ring/outer ring of a thin-wall bearing of claim 1, wherein, in the step S1, further reinforcing the thin-wall ring along the radial direction, and reinforcing the reinforcing part on an outer circular surface of the thin-wall ring provided in the step S0.

3. The method for machining a thin-wall inner ring/outer ring of a thin-wall bearing of claim 2, wherein, in the step S0, the provided thin-wall ring has a raceway; in the step S3, the process of hard turning, grinding and superfinishing the heat-treated reinforcing ring includes:

grinding two end surfaces, an inner circular surface, an outer circular surface and a raceway surface of the heat-treated reinforcing ring;

superfinishing the raceway surface after the raceway surface grinding is performed; and after that:

hard turning the outer circular surface of the heat-treated reinforcing ring to remove the reinforcing part of the radial reinforcement.

4. The method for machining a thin-wall inner ring/outer ring of a thin-wall bearing of claim 3, wherein the raceway surface intersects the inner circular surface.

5. The method for machining a thin-wall inner ring/outer ring of a thin-wall bearing of claim 2, wherein, a wall thickness of the reinforcing part is 0.2 to 10 times a wall thickness of the thin-wall ring provided in the step S0.

6. The method for machining a thin-wall inner ring/outer ring of a thin-wall bearing of claim 1, wherein, in the step S1, further reinforcing the thin-wall ring in the axial direction, and the reinforcing part is reinforced on one end surface of the thin-wall ring.

7. The method for machining a thin-wall inner ring/outer ring of a thin-wall bearing of claim 1, wherein, in the step S1, the reinforcement is further performed simultaneously along the radial and axial directions of the thin-wall ring; the reinforcing part includes a radial reinforcing part and an axial reinforcing part; the radial reinforcing part is located on outer circular surface of the thin-wall ring, and the axial reinforcing part is located on one end surface of the thin-wall ring.

8. The method for machining a thin-wall inner ring/outer ring of a thin-wall bearing of claim 7, wherein during the grinding, hard turning, and superfinishing the axial reinforcing part is firstly removed, and then the radial reinforcing part is removed.

* * * * *